Patented June 17, 1947

2,422,550

UNITED STATES PATENT OFFICE 2,422,550

POLYMERIZATION OF VINYL COMPOUNDS WITH RUBBER

Ralph A. Jacobson, Landenburg, Pa., assignor to E. I. du Pont de Nemours & Company, Wilmington, Del., a corporation of Delaware No Drawing. Application October 20, 1942, Serial No. 462,751

18 Claims. (Cl. 260—4)

This invention relates to valuable compositions of matter and to a process for their production. More particularly it relates to copolymers of natural rubber with polymerizable, unsaturated compounds and to a process for their production.

Copolymerization reactions involving vinyl compounds are assuming increasing importance in the commercial resin field as a means for overcoming a large number of disadvantages associated with known polymers and in opening up further new fields for materials capable of vinyl polymerization. Previous attempts to modify natural rubber by copolymerization of vinyl compounds have been generally unsuccessful. It has been reported in the literature (Transactions of the Institution of the Rubber Industry, vol. 15, page 156) that investigation of the polymerization of vinyl compounds, both in solution and emulsion, in the presence of rubber latex showed the methods to be impracticable because of the presence of the rubber very greatly retarded the polymerization process.

This invention has as its object to provide a process for the copolymerization of a natural rubber with polymerizable, unsaturated compounds which will overcome the difficulties of the prior art. Another object is to provide such a process that is both economical and easily adapted to efficient large-scale production. Still another object is to provide a process which will combine the valuable characteristics of rubber, such as plasticity and resistance, with the desirable characteristics of vinyl plastics, such as resistance to heat, solvents and oxidation. Still another object is the preparation of certain new and improved polymeric compounds. Other objects will be apparent from the following description of the invention.

These objects are accomplished by the following invention which comprises polymerizing the polymerizable components of an aqueous emulsion of "natural rubber" and at least one polymerizable, unsaturated compound, said emulsion containing a dissolved salt of perdisulfuric acid and a dispersing agent selected from the group consisting of

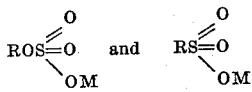

wherein R is an acyclic hydrocarbon of 12 to 18 carbon atoms, and M is an alkali metal, said polymerization being preferably carried out in a closed vessel containing a substantially oxygen-free gas space over the emulsion. By "natural rubber" is meant a hydrocarbon polymer corresponding essentially to the empirical formula, $(C_5H_8)_n$, which is derived from the sap of trees belonging to the family of Euphorbiacae, Moraceae and other plants which yield a milky latex. The most familiar type of natural rubber is obtained from trees of the genus Hevea of the Euphorbiacae family.

In general, the customary mode of practicing this invention is as follows: An aqueous medium containing about 0.1 to 2% of a perdisulfate salt and about 1 to 5% of a dispersing agent as defined above is placed in a suitable pressure vessel which is provided with a means of agitation such as stirring or shaking. The mixture of rubber latex and polymerizable, unsaturated compound to be polymerized is then added in such proportions that the ratio of the aqueous to the non-aqueous phase lies within the range of 2:1 and 3:1. Atmospheric oxygen is removed from the vessel by flushing with nitrogen and the vessel is then sealed. The mixture is then agitated vigorously to produce emulsification. It is thereafter heated at a constant temperature in the range of about 20° C. to about 80° C. with constant or intermittent agitation until the polymerization has proceeded to the desired extent.

The following examples, in which parts are given by weight, more fully illustrate the invention.

Example 1

A solution of 7.8 parts of a commercial dispersing agent containing about 22% of sodium cetyl sulfate as active ingredient in 110 parts of water is prepared by warming on the steam bath and charged into a vessel capable of withstanding moderate pressures. The solution is cooled to room temperature and 57 parts of methyl methacrylate, 5 parts of "natural rubber" (Hevea brasiliensis) latex containing 60% rubber, and 0.612 part of ammonium perdisulfate added in the order named. The air in the reaction vessel is flushed out with nitrogen after which the mixture is agitated in the absence of air for 24 hours at 45° C. Steam is passed into the mixture to volatilize any residual monomer. The polymerization mixture is then cooled to 50° C. and 20 parts of 10% aluminum sulfate added with stirring to coagulate the dispersion. The product which separates is filtered, thoroughly washed with water and dried. The yield amounts to 60 parts. Specimens of the copolymer molded at 165° C. and 2,000 lbs./sq. in. pressure are rather dark in color, transparent, hard and horn-like. Films flowed from toluene solutions of the product are transparent and very flexible.

Example 2

A mixture of 48 parts of methyl methacrylate and 20 parts of rubber latex containing 60% rubber is polymerized exactly as in Example 1 and yields 56 parts of polymer which can be molded to articles of wax-like texture. Films flowed from a toluene solution of the copolymer are colorless, transparent and very tough.

Example 3

A mixture of 60 parts of methyl methacrylate and 50 parts of rubber latex (60% rubber) is polymerized as in Example 1 and there is obtained 90 parts of polymer which can be molded into tough articles.

Example 4

A mixture of 100 parts of rubber latex (60% rubber) and 12 parts of methyl methacrylate is polymerized as in Example 1, except that the polymerization is carried out for a total of 6 hours at 40° C. There is thus obtained 71.4 parts of polymer, which corresponds to copolymer containing 13% methyl methacrylate based on weight differences. The product can be compounded and vulcanized following the usual procedures. The vulcanizates are somewhat stiffer than natural rubber.

Example 5

A mixture containing 48 parts of styrene and 20 parts of rubber latex (60% rubber) is polymerized as in Example 1 and yields 59.8 parts of polymer. Specimens molded at 165° C. and 2000 lbs./sq. in. pressure are somewhat wax-like in character and exceedingly tough.

Example 6

A solution of 11.9 parts of the sodium salt of sulfonated paraffin oil, a commercial dispersing agent containing about 32% active ingredient, (essentially identical to that described in Example III of U. S. Patent 2,197,800) in 111 parts of water is prepared by warming on the steam bath and charged into a suitable pressure vessel. The solution is cooled to room temperature and 57 parts of styrene, 5 parts of rubber latex (60% rubber) and 0.612 part of ammonium perdisulfate added in the order named. The polymerization is then carried out as described in Example 1 and there is thus obtained 59.5 parts of copolymer. Specimens molded at 165° C. and 2000 lbs./sq. in. pressure are very tough. Films of the copolymer, flowed from toluene solution, are pliable and flexible.

Example 7

A mixture of 100 parts of rubber latex (60% rubber) and 18 parts of styrene is polymerized as in Example 1, except that the polymerization is carried out for a total of 24 hours at 70° C. There is thus obtained 70.4 parts of polymer containing approximately 15% styrene based on weight differences. The product can be compounded and vulcanized following the usual procedures and yields softer compositions than natural rubber.

Example 8

A polymerization mixture consisting of 77 parts of water, 5.2 parts of the dispersing agent described in Example 1, 50 parts of natural rubber latex (60% rubber), 10 parts of acrylonitrile, and 0.408 part of ammonium perdisulfate is prepared as described in Example 1. The polymerization is then conducted as in Example 1 and yields 35.2 parts of copolymer. A chip molded at 165° C. and 2000 lbs./sq. in. pressure is pliable, rubbery and tough. The plastic copolymer is compounded according to the following formula and cured in a mold at 165° C. for 15 minutes.

| | Parts |
|---|---|
| Copolymer | 5.0 |
| Stearic acid | 0.15 |
| Zinc oxide | 0.35 |
| Captax | 0.05 |
| Sulfur | 0.15 |
| Neozone D | 0.05 |
| Micronex Black | 1.0 |

The cured product is extremely tough but is lower in tensile strength than natural rubber.

Example 9

A polymerization mixture consisting of 55 parts of water, 3.9 parts of the dispersing agent described in Example 1, 30 parts of vinyl acetate, 16.6 parts of natural rubber latex (60% rubber), and 0.306 part of ammonium perdisulfate is prepared and polymerized as in Example 1. There is thus obtained 35 parts of polymer.

Example 10

A solution consisting of 100 parts of water, 4.6 parts of the dispersing agent described in Example 6, 80 parts of natural rubber latex, 16 parts of butyl methacrylate and 0.5 part of ammonium perdisulfate is prepared as in Example 1. The polymerization is then conducted in similar fashion, except it is carried out for a total of 24 hours at 68° C. The copolymer obtained amounts to 60 parts. It may be compounded and cured as described in Example 8, and gives light-colored, stiff vulcanizates.

Example 11

A mixture of 30 parts of asymmetrical dichloroethylene and 16.6 parts of natural rubber latex (60% rubber) is polymerized as in Example 9 and yields 35 parts of copolymer. Clear, transparent, rubber-like products are obtained on vulcanization.

Example 12

A mixture of 75 parts of natural rubber latex (60% rubber) and 15 parts of 2-nitro-2-methyl propyl methacrylate is polymerized as in Example 1 and yields 57 parts of copolymer. The product is a flexible, elastic and pliable material which molds readily at 165° C. and 2900 lbs./sq. in. pressure.

While all the examples deal with the polymerization of a polymerizable, unsaturated compound in the presence of rubber latex (Hevea brasiliensis), the invention is not limited to this natural elastomer. Any natural rubber may be used for example, other lactices from substances similar to rubber, e. g., balata and guttapercha, may be copolymerized with the polymerizable, unsaturated compounds. It is also within the scope of this invention to copolymerize one or more of these lactices with a single or a mixture of polymerizable, unsaturated compounds. The compounds which may be copolymerized with natural rubber according to the process of this invention may be defined as polymerizable unsaturated compounds containing a terminal methylene group attached by an ethylenic double bond to a carbon atom, which is in turn attached to at least one negative group of the class consisting of aryl, halogen, acyloxy, carboalkoxy, acyl, cyano and alkoxy. Specific examples of compounds of this class include vinyl aromatic hydrocarbons such as styrene, vinyl esters as vinyl acetate, methacrylic esters as methyl methacrylate and butyl methacrylate, acrylates, as methyl acrylate, acrylo- and methacrylonitrile, asymmetrical dichloroethylene, vinyl ketones as methyl vinyl ketone, vinyl ethers, and derivatives of alpha, beta-unsaturated acids.

As has been indicated above, it is an object of this invention to modify both the properties of the polymer and the rubber-like substances. The invention, therefore, is not limited to the proportions set forth in the examples and the amount of the polymerizable, unsaturated compound employed may vary from 1% to 99% of the total amount of the rubber and compound being co-polymerized. The most valuable products are obtained by copolymerizing mixtures containing large amounts, preferably 70 to 95%, of the polymerizable, unsaturated compounds with rubber and mixtures containing large amounts, preferably 70-95%, of rubber with the polymerizable, unsaturated compounds. The modified polymerizable, unsaturated copolymers containing 5 to 30% of rubber possess properties similar to the unmodified polymers but in general have improved toughness and elasticity, whereas the products of the second group, i. e., copolymers of rubber modified with 5 to 30% of the polymerizable, unsaturated compounds are rubbery but have greater resistance to heat, solvents and oxidation than unmodified rubber. Thus, it is possible to prepare products having preselected properties by choosing the proper proportion of constituents.

The polymerization catalysts encompassed by this invention comprise the water-soluble salts of perdisulfuric acid. In addition to the ammonium salt disclosed in the examples, there may also be used the sodium, potassium, lithium, barium, and calcium perdisulfates. It is observed that the sulfate ion appears in aqueous solutions of perdisulfates. For this reason, while the water-soluble alkaline earth metal salts are operable, they are not usually used because of their tendency to form a precipitate of the corresponding alkaline earth sulfate. The preferred salts are the ammonium and alkali metal salts. Ammonium perdisulfate is especially suited for economic considerations.

The concentration of perdisulfate salt employed may be varied within wide limits. For instance, amounts of perdisulfates varying from 0.1% to 10% of the quantity of monomer employed are operable. In respect to economy of catalyst, quality of product and rapidity of polymerization, the preferred proportion of perdisulfate salts lies in the range of 0.1% to 4% based on weight of monomer.

As dispersing agents in addition to those disclosed in the foregoing examples, there may be mentioned the alkali metal salts of the following long chain alkyl sulfates and sulfonates: Dodecyl-1 acid sulfate, tetradecyl-1 acid sulfate, octadecyl-1 acid sulfate, dodecane-1-sulfonic acid, tetradecane-1-sulfonic acid, hexadecane-1-sulfonic acid and octadecane-1-sulfonic acid. The salts of long chain sulfonated paraffin oil hydrocarbons are especially effective dispersants, and need be employed only in small proportions to achieve the desired results. It will be understood that the dispersants to which reference is made above are commercial materials which, because of the methods used in their manufacture and because of the sources of the starting materials, are usually not produced in high state of purity and contain minor constituents which influence the effectiveness of the active ingredient. Polymerization systems containing such ancillary ingredients, which are present adventitiously or added deliberately, are recognized as part of this invention. These ingredients, which are useful only when a suitable dispersant is also present, may include inorganic salts, long chain primary alcohols, carbohydrate derivatives, polyvinyl alcohol, etc.

Using the rate of polymerization as a criterion, the invention encompasses the use of dispersing agent active ingredients in concentrations of 0.2 to 5% based on the weight of the aqueous medium used in the copolymerization of polymerizable, unsaturated monomers and rubber. Within this range the preferred concentration will in general depend upon the proportion of monomer present, but is usually from 0.5 to 4%. From the standpoint of economy and to facilitate removing the dispersing agent from the polymerized product, it is customary to use the least amount of dispersing agent necessary to bring about the desired rate of polymerization. It is to be understood that when reference is made to the use of definite percentages of dispersing agents, these values are calculated on the basis of the known active ingredient concentration in the commercial dispersants.

It may also be pointed out that the effectiveness of the dispersing agent, especially if small concentrations are employed, is enhanced by agitation of the mixture. Any method of agitation may be used in producing and maintaining the emulsions. The most commonly employed method of mixing is stirring preferably in vessels containing suitable baffles. Other methods include shaking, tumbling and the use of turbo-mixers. The dispersing agents operable in this invention are in general useful in forming stable emulsions, which after they are once formed, require little or no agitation thereafter. It has been found, however, that polymerization occurs more rapidly in certain emulsions while they are being agitated. It is, accordingly, preferred to assist the dispersing agent in producing and maintaining the emulsion by mechanical means which may or may not be continuous. It should be emphasized that the dependence of the efficiency of the dispersing agents upon the active ingredient concentration and agitation in no way repudiates the sharp distinction noted between the dispersing agents used in this invention and those which are not comprehended within this class of compounds. Thus, with the usual dispersing agents it is impossible to obtain the rapid rate characteristic of the agents used in my invention either by most vigorous agitation or by the use of concentrations as high as the solubility of the material will permit. Even in instances where such modifications of systems involving usual dispersing agents permit sufficient acceleration of the polymerization rate, the process is not practicable because of the expense and operating difficulties entailed by the use of very high proportions of such dispersing agent.

The operability of the invention is not confined to any particular proportion of polymerizable monomer or monomers and natural rubber polymer relative to the amount of aqueous media present. Thus, the ratio of the aqueous to the non-aqueous phase may vary between approximately 10:1 and 1:1. In general, it is preferred that the aqueous/non-aqueous ratio shall be approximately 4:1 to 1:1 since for a given reaction vessel the time-space yield is greatly reduced by the use of higher ratios. The amount of water present initially in the rubber latex must be taken into account in calculating these ratios. It is also helpful in maintaining an emulsion if the proportion by weight of non-aqueous to aqueous phases is not greater than 1:1.

As is well known, the dependence of the rate of vinyl polymerization upon the temperature is very important, and low temperatures cannot be generally used because the corresponding rate of reaction is impracticably low. The present invention can be operated at any temperature within the range above the freezing point of the aqueous phase which is somewhat below 0° C. up to about 100° C., above which the product may be adversely affected by the aqueous medium. It is preferred to employ temperatures in the range of 20° C. to 70° C.

It is realized that the presence of oxygen in the polymerization vessel, while not appearing to have a deleterious effect on the properties of the polymers of this invention, may have an adverse effect on the rate of polymerization in certain cases. In these cases it is, therefore, preferable to displace the air from the polymerization vessel by means of a gas which does not reduce the rate of polymerization. Suitable gases are nitrogen, carbon dioxide, methane and helium. These gases may be passed through the free space of the polymerization vessel until the air has been completely displaced or may be introduced under pressure and purged several times, so that the oxygen originally present is so greatly diluted as to have little effect on the rate of polymerization.

The process is not limited to any particular apparatus but it is important that the reaction vessel shall be constructed of material which has no effect on the rate of polymerization or on the quality of the products and is not affected by the aqueous medium used in carrying out the polymerization. Suitable vessels may be constructed of stainless steel, nickel, silver or lead. Vessels equipped with glass or enamel liners may also be used.

In the examples, all of the polymerizable, unsaturated compound is added initially to the aqueous dispersion prior to polymerization. It is within the scope of the present invention to add the polymerizable, unsaturated compound portionwise to the dispersion during the polymerization, or to add the rubber latex to the partially polymerized compound and then to continue the polymerization. The conditions selected for copolymerizing rubber with a given polymerizable, unsaturated compound will depend upon the ease with which the compound polymerizes and upon the type of product desired.

At the conclusion of polymerization the products of this invention may be isolated by a variety of methods. For example, the dispersion may be sprayed into a heated and/or evacuated chamber whereby the water is removed as vapor and the polymer falls to the bottom of the chamber. The polymer may also be isolated by cooling the dispersion below the freezing point of the aqueous medium or by the addition of a large volume of a lower aliphatic alcohol such as methanol or ethanol. The most satisfactory method consists in adding an appropriate amount of an electrolyte solution to the diluted aqueous dispersion with rapid agitation at a temperature of about 90° C. This procedure yields the polymer in a form in which it is readily filtered and washed. Suitable electrolytes include sodium chloride, sodium sulfate, hydrochloric acid, phosphoric acid, calcium chloride, magnesium sulfate, lead nitrate, lead acetate, stannous chloride, and aluminum sulfate. After precipitation of the polymer it is filtered and washed repeatedly with water to remove traces of electrolyte and dispersing agent which may adhere to the particles. Washing with dilute solutions (0.1 to 1%) of caustic soda or ammonium hydroxide assists in removing the last traces of dispersing agent and at the same time yields polymers of improved heat stability. In order to facilitate low temperature drying of the polymers, it is beneficial to employ a final wash with a lower aliphatic alcohol such as methanol or ethanol.

The electrolyte and dispersing agent are also conveniently removed by washing the coagulum with water at 50° C. on a mill consisting of corrugated rolls turning at different speeds or in an internal mixer, by which methods new surfaces of the polymer are being continuously exposed to washing medium.

The coagulum after being washed and stabilized by the addition of an anti-oxidant such as phenyl-beta-naphthylamine, if necessary, may be dried in a current of air at elevated temperatures up to about 100° C. or at subatmospheric pressure or may be milled directly, the mechanically generated heat in the latter case assisting in the removal of the water. The temperature of the polymer being milled, however, should not exceed about 100° C. and preferably should be much less. The smooth rolls of the mill should, therefore, be cooled, for example with cold water or refrigerating brine.

As already stated, products having most diverse properties can be prepared by a suitable choice of type and amount of vinyl compound used with natural rubber. It is not possible to draw any exact generalizations concerning the properties of these products, but it may be said that when rubber predominates the products possess properties similar to the latter. Copolymers prepared from mixtures containing large amounts of vinyl compounds resemble the corresponding unmodified vinyl polymer except they generally have a toughness and elasticity similar to that of rubber. The products will range from soft, wax-like solids to strong plastic masses, elastic extensible materials, tough resinous masses or hard, brittle resins. Some of them will have properties which make them very useful as rubber substitutes for the preparation of molded, dipped, coated and extruded articles, while others are valuable as adhesive, impregnating and film forming materials. In applying the products of this invention it is often desirable to combine them with plasticizers, stabilizers, pigments, dyes, fillers, softeners, oils, natural resins, or other synthetic resins. The polymers may also be prepared in the presence of these materials.

As many apparently widely different embodiments of this invention may be made without departing from the spirit and scope thereof, it is to be understood that this invention is not to be limited to the specific embodiments shown and described.

I claim:

1. A process for the copolymerization of a natural rubber with a polymerizable, monoethylenically-unsaturated compound which comprises polymerizing at temperatures ranging from 0° C. to 100° C. the polymerizable components of an aqueous emulsion of a natural rubber admixed with from 70–95% by weight, based on the weight of the rubber and polymerizable monomer present, of a polymerizable, monoethylenically-unsaturated compound containing a terminal methylene group attached by an ethylenic double bond to a carbon atom which, in turn, is attached to a negative group selected from the class consisting of aryl, halogen, acyloxy, carboalkoxy, acyl, and cyano, said aqueous medium having a ratio of aqueous to non-aqueous phase of from 10:1 to 1:1 and containing from .1% to 10%, based on the weight of the monomer present, of a dissolved salt of perdisulfuric acid and from .2% to 5%, based on the weight of the aqueous medium, of a dispersing agent selected from the group consisting of

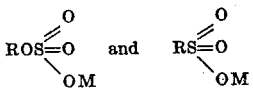

wherein R is an acyclic hydrocarbon of 12 to 18 carbon atoms and M is an alkali metal.

2. The process in accordance with claim 1 characterized in that aqueous emulsion of the natural rubber is rubber latex.

3. The process in accordance with claim 1 characterized in that the dispersing agent is sodium cetyl sulfate.

4. The process in accordance with claim 1 characterized in that the dispersing agent is the sodium salt of sulfonated paraffin oil.

5. The process in accordance with claim 1 characterized in that the salt of perdisulfuric acid is ammonium salt.

6. The process in accordance with claim 1 characterized in that the polymerizable, unsaturated compound is an ester of an alpha-methylene monocarboxylic acid.

7. The process for the copolymerization of rubber latex with a polymerizable, monoethylenically-unsaturated ester of methacrylic acid which comprises polymerizing, at temperatures ranging from 20° C. to 70° C., the polymerizable components of an aqueous emulsion of rubber latex and said ester of methacrylic acid, employing in the mixture from 70-95%, by weight, of said ester, based on the weight of the rubber and polymerizable monomer in the emulsion, said aqueous medium having an aqueous to non-aqueous ratio of from 4:1 to 1:1 and containing from .1 to 4%, based on the weight of monomer present, of a dissolved salt of perdisulfuric acid and from .5-4%, based on the weight of the aqueous medium, of a dispersing agent selected from the group consisting of

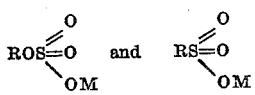

wherein R is an acyclic hydrocarbon of 12 to 18 carbon atoms, and M is an alkali metal.

8. The process for the copolymerization of rubber latex with a monoethylenically-unsaturated vinyl ester, comprising polymerizing at temperatures ranging from 20° C. to 70° C. the polymerizable components of an aqueous emulsion of rubber latex and said ester, employing in the mixture from 70-95%, by weight, of said ester, based on the weight of the rubber and polymerizable monomer in the emulsion, said aqueous medium having an aqueous to non-aqueous ratio of from 4:1 to 1:1 and containing from .1% to 4%, based on the weight of monomer present, of a dissolved salt of perdisulfuric acid and from .5-4%, based on the weight of the aqueous medium, of a dispersing agent selected from the group consisting of

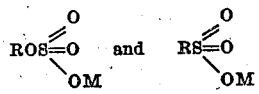

wherein R is an acyclic hydrocarbon of 12 to 18 carbon atoms, and M is an alkali metal.

9. The process for the copolymerization of rubber latex with styrene which comprises polymerizing, at temperatures ranging from 20° C. to 70° C., the polymerizable components of an aqueous emulsion of rubber latex with styrene, employing in the mixture from 70-95%, by weight, of styrene, based on the weight of the rubber and polymerizable monomer in the emulsion, said aqueous medium having an aqueous to non-aqueous ratio of from 4:1 to 1:1 and containing from .1 to 4%, based on the weight of monomer present, of a dissolved salt of perdisulfuric acid and from .5-4%, based on the weight of the aqueous medium, of a dispersing agent selected from the group consisting of

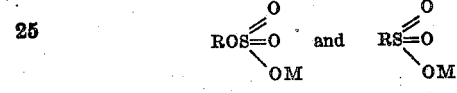

wherein R is an acyclic hydrocarbon of 12 to 18 carbon atoms, and M is an alkali metal.

10. A process for the copolymerization of rubber latex with a polymerizable monoethylenically-unsaturated ester of methacrylic acid which comprises emulsifying said rubber latex with said methacrylic acid ester, the amount of the latter present ranging from 70-95%, based on the weight of the rubber and polymerizable monomer in the emulsion, effecting said polymerization in an aqueous medium in which an aqueous/non-aqueous ratio of from 4:1 to 1:1 exists and which contains from about 0.1% to 4%, based on the weight of said ester, of dissolved ammonium perdisulfate, and from about 0.5% to 4%, based on the weight of the aqueous medium, of sodium cetyl sulfate as a dispersing agent, and then polymerizing the resulting emulsion at a temperature ranging from about 20° C.–70° C., while maintaining said emulsion in contact with an atmosphere of an oxygen-free gas.

11. The process in accordance with claim 8 characterized in that the reaction is carried out with a substantially oxygen-free gas in contact with said emulsion.

12. The process in accordance with claim 9 characterized in that the reaction is carried out with a substantially oxygen-free gas in contact with said emulsion.

13. The conjoint polymer of natural rubber and a polymerizable, monoethylenically-unsaturated compound containing a terminal methylene group attached by an ethylenic double bond to a carbon atom which, in turn, is attached to a negative group selected from the class consisting of aryl, halogen, acyloxy, carboalkoxy, acyl, and cyano, prepared by the emulsion polymerization, at temperatures ranging from 0° C. to 100° C., of a mixture of said components while in aqueous emulsion, said polymerizable compound being present in an amount ranging from 70-95% by weight, based on the weight of the rubber and polymerizable monomer present in said mixture, and the aqueous medium having a ratio of aqueous to non-aqueous phase of from 10:1 to 1:1, and containing from .1% to 10%, based on the weight of the monomer present, of a dissolved salt of perdisulfuric acid, together with from .2% to 5%, based on the weight of the aqueous medium, of a dispersing agent selected from the group consisting of

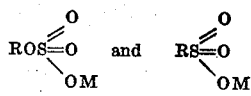

wherein R is an acyclic hydrocarbon of 12 to 18 carbon atoms and M is an alkali metal.

14. The conjoint polymer of rubber latex and a polymerizable, monoethylenically-unsaturated ester of methacrylic acid prepared by the emulsion polymerization of a mixture of said components, at temperatures ranging from 20° C. to 70° C., while in an aqueous emulsion, said ester being present in said mixture in an amount ranging from 70-95%, by weight, of said ester, based on the weight of the rubber and polymerizable monomer in the emulsion, and the aqueous medium having an aqueous/non-aqueous ratio of from 4:1 to 1:1 and containing from .1%-4%, based on the weight of said ester, of a dissolved salt of perdisulfuric acid, together with from .5%-4%, based on the weight of the aqueous medium, of a dispersing agent selected from the group consisting of

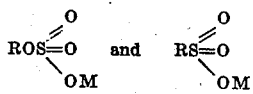

wherein R is an acyclic hydrocarbon of 12 to 18 carbon atoms, and M is an alkali metal.

15. The conjoint polymer of rubber latex and a polymerizable monoethylenically - unsaturated vinyl ester prepared by the emulsion polymerization of a mixture of said components, at temperatures ranging from 20° C. to 70° C., while in an aqueous emulsion, said ester being present in said mixture in an amount ranging from 70-95%, by weight, of said ester, based on the weight of the rubber and polymerizable monomer in the emulsion, and the aqueous medium having an aqueous/non-aqueous ratio of from 4:1 to 1:1 and containing from .1%-4%, based on the weight of said ester, of a dissolved salt of perdisulfuric acid, together with from .5%-4%, based on the weight of the aqueous medium, of a dispersing agent selected from the group consisting of

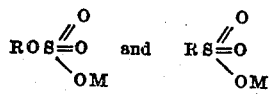

wherein R is an acyclic hydrocarbon of 12 to 18 carbon atoms, and M is an alkali metal.

16. The conjoint polymer of rubber latex and styrene prepared by the emulsion polymerization of a mixture of said components, at temperatures ranging from 20° C. to 70° C., while in aqueous emulsion, said styrene component being present in an amount ranging from 70-95%, by weight, based on the weight of the rubber and polymerizable monomer in the emulsion, said aqueous medium having an aqueous/non-aqueous ratio of from 4:1 to 1:1, and containing from .1-4%, based on the weight of the styrene, of a dissolved salt of perdisulfuric acid, together with from .5-4%, based on the weight of the aqueous medium, of a dispersing agent selected from the group consisting of

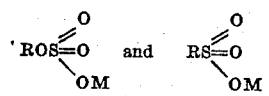

wherein R is an acyclic hydrocarbon of 12 to 18 carbon atoms, and M is an alkali metal.

17. A process for the copolymerization of a natural rubber with a polymerizable, monoethylenically-unsaturated compound containing a terminal methylene group attached by an ethylenic double bond to a carbon atom which, in turn, is attached to a negative group selected from the class consisting of aryl, halogen, acyloxy, carboalkoxy, acyl, and cyano, which comprises emulsifying said natural rubber while in admixture with from 70-95% of said polymerizable compound, said percentage amounts being based on the weight of the rubber and polymerizable monomer present, in an aqueous medium having a ratio of aqueous to non-aqueous phase of from 10:1 to 1:1 and containing from about 0.1% to 10%, based on the weight of monomer employed, of a dissolved salt of perdisulfuric acid, together with from about 0.2% to 5%, based on the weight of said aqueous medium, of a dispersing agent selected from the group consisting of

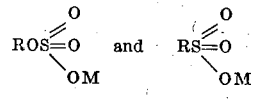

wherein R is an acyclic hydrocarbon of 12 to 18 carbon atoms and M is an alkali metal, and then polymerizing the resulting emulsion at a temperature ranging from about 0° C.–100° C., while maintaining an inert, oxygen-free gas in contact with said emulsion.

18. A process for the co-polymerization of rubber latex with a polymerizable monoethylenically-unsaturated ester of methacrylic acid which comprises emulsifying said rubber latex with said methacrylic acid ester, the amount of the latter present ranging from 70-95%, based on the weight of the rubber and polymerizable monomer in the emulsion, effecting said polymerization in an aqueous medium in which an aqueous/non-aqueous ratio of from 4:1 to 1:1 exists and which contains from about 0.1% to 4%, based on the weight of said ester, of dissolved ammonium perdisulfate, and from about 0.5% to 4%, based on the weight of the aqueous medium, of sodium cetyl sulfate as a dispersing agent, and then polymerizing the resulting emulsion at a temperature ranging from about 20° C.–70° C., while maintaining said emulsion in contact with an atmosphere of nitrogen.

RALPH A. JACOBSON.

REFERENCES CITED

The following references are of record in the file of this patent:

UNITED STATES PATENTS

| Number | Name | Date |
|---|---|---|
| 1,900,663 | Plauson | Mar. 7, 1933 |
| 2,222,967 | Wollthan et al. | Nov. 26, 1940 |
| 2,281,613 | Wollthan et al. | May 5, 1942 |
| 2,284,280 | Habgood et al. | May 26, 1942 |
| 2,348,154 | Scott | May 2, 1944 |
| 2,234,204 | Starkweather | Mar. 11, 1941 |
| 2,306,411 | Schoenfeld | Dec. 29, 1942 |

FOREIGN PATENTS

| Number | Country | Date |
|---|---|---|
| 514,912 | Great Britain | Nov. 21, 1939 |

OTHER REFERENCES

"India Rubber World" of July 1942, pp. 347, 348, 349.

"Proc. of the Rubber Techn. Conference," London, 1938, p. 533.